(12) United States Patent
Draper et al.

(10) Patent No.: US 8,096,116 B2
(45) Date of Patent: Jan. 17, 2012

(54) MOORING OF MULTIPLE ARRAYS OF BUOY-LIKE WECS

(75) Inventors: Mark R. Draper, Warks (GB); David Henry Silcock, Hillsborough, NJ (US)

(73) Assignee: Ocean Power Technologies, Inc., Pennington, NJ (US)

( * ) Notice: Subject to any disclaimer, the term of this patent is extended or adjusted under 35 U.S.C. 154(b) by 348 days.

(21) Appl. No.: 12/009,798

(22) Filed: Jan. 22, 2008

(65) Prior Publication Data

US 2009/0183667 A1    Jul. 23, 2009

(51) Int. Cl.
*F03B 13/12* (2006.01)
(52) U.S. Cl. .................. 60/398; 290/42; 290/53
(58) Field of Classification Search ............. 405/25–27, 405/76, 203, 224; 441/23; 60/398, 497, 60/498, 500, 501, 505; 417/330–333; 290/42, 290/53; 114/293, 230.1, 230.2
See application file for complete search history.

(56) References Cited

U.S. PATENT DOCUMENTS

| | | | | |
|---|---|---|---|---|
| 3,546,473 A | * | 12/1970 | Rich | 290/42 |
| 4,153,962 A | * | 5/1979 | Johnson | 441/23 |
| 2008/0267712 A1 | * | 10/2008 | Jean et al. | 405/76 |

FOREIGN PATENT DOCUMENTS

JP        2004176626 A   *  6/2004

* cited by examiner

*Primary Examiner* — Sunil Singh
(74) *Attorney, Agent, or Firm* — Henry I. Schanzer

(57) ABSTRACT

For reducing the number of anchors required for mooring a plurality of WECs in a body of water, the WECs are arrayed in two patterns enabling the sharing of anchors among the WECs. One pattern comprises pluralities of WECs disposed in polygonal shaped cells with an anchor disposed beneath each cell connected to all the WECs in the cell. A second pattern comprises a tessellated pattern of contiguous cells with WECs at the interface between contiguous pairs of cells being common to both cells of the pairs.

20 Claims, 4 Drawing Sheets

BW connected to A1, A3, A4
BX connected to A1, A2, A3
BY  "  " A1, A2, A4
BZ  "  " A2, A3, A4

MOORING OF MULTIPLE ARRAYS OF BUOY-LIKE WECS

BACKGROUND OF THE INVENTION

This invention relates to wave energy converters (WECS) for converting energy in the waves on the surface of bodies of water to useful energy, and particularly to the mooring or anchoring of multiple groups or arrays of WECs of the floating buoy type. One known type of WEC, with which the present invention is primarily concerned, comprises a buoy including parts which are driven into movements in response to passing surface waves. Such movements are used for driving an energy transducer for generating useful energy. For retaining the buoy in place, one practice is to connect the buoy to three anchors spaced around the buoy. A problem with this, however, is that if a plurality of WECs is used for increasing the amount of generated power, the need for three anchors for each WEC (providing a buoy to anchor ratio of 1:3) is both expensive and space consuming.

An object of this invention is the provision of mooring arrangements where the ratio of WEC buoys to anchors is significantly increased.

SUMMARY OF THE INVENTION

A plurality of WECs is disposed within a body of water in two patterns. The first pattern comprises a grouping of the WECs in polygonal cells, preferably hexagonal or octagonal, with a WEC at each of the cell corners. The second pattern comprises a grouping of the polygonal cells in a tessellated pattern of contiguous cells with the WECs at the interface between contiguous pairs of cells being common to both cells. A plurality of anchors is disposed on the floor of the water body with a respective anchor underlying each cell and connected to all the WECs forming the cell. With some patterns, e.g. hexagonal-shaped cells, the anchor disposed beneath each cell is connected only to WECs included in the overlying cell. With other patterns, e.g. octagonal-shaped cells, the anchor disposed beneath each cell is connected to WECs both within and outside the overlying cell.

BRIEF DESCRIPTION OF THE DRAWINGS

In the accompanying schematic drawings, which are not drawn to scale, like reference characters denote like components.

Table 1 lists buoy (B) to anchor (A) ratios (B/A) for selected hexagonal layouts.

DETAILED DESCRIPTION

Figure 1:
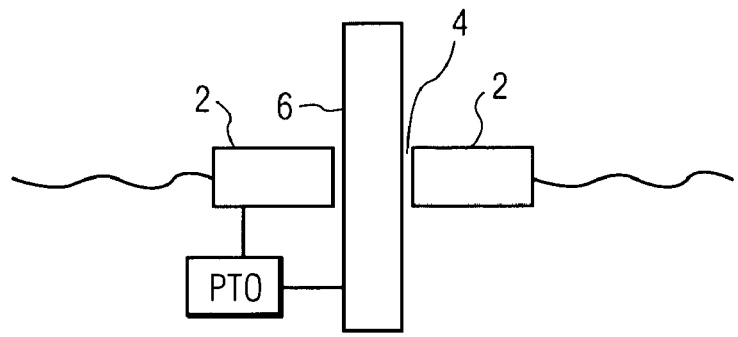
FIG. 1 shows an example of a WEC with which the present invention can be used.

The present invention concerns the disposition of a plurality of wave energy converters (WECs) in a body of water. An example of a WEC suitable for use with the present invention is shown, schematically, in FIG. 1. The WEC includes a generally flat float 2 having a central opening 4 there through and an elongated float 6, referred to as a "spar", slidably extending through the flat float central opening 4. The two floats bob up-and-down in response to passing surface waves but in different phase relationships with the waves, hence in out-of-phase relationship with each other. Such out-of-phase, relative movements between the two floats are used for generating useful energy by driving a power take off (PTO) device, e.g. a hydraulic cylinder for pressurizing a fluid used to drive a turbine for driving an electric generator.

For increasing the amount of generated power, groups of WECs are interconnected in "farms" of WECs disposed within a body of water. In accordance with this invention, groups of WECs are interconnected in patterns for tiling the surface area where they are located. A tiling of a surface consists of an arrangement of polygons which together covers the entire area of a two-dimensional surface. Many such tilings are possible using one or more types of regular and/or irregular polygons. However, for greater simplicity, only periodic tilings (tessellations), using regular polygons, are herein disclosed. In the accompanying drawings and in the description below a WEC is also referred to as a buoy and identified by the letter "B".

Given a two dimensional water body floor, a set of rules governing the placement of buoys and anchors is as follows:
1. Buoys are arranged on the water body surface in a plurality of contiguous polygonal-shaped cells, with each buoy being at a respective cell vertex.
2. A plurality of anchors is disposed on the seabed one each beneath the centroid of each cell.
3. Each anchor beneath a cell of buoys is connected to all the buoys within the cell and, in some instances, to buoys within adjacent cells.

Disposition of buoys and anchors in accordance with these rules is efficient in the sense that it results in relatively high values for the aggregate "buoy to anchor ratio" of the buoy field, and also provides a stable mooring for each buoy. The buoy to anchor ratio is the quotient B/A, where B is the total number of buoys and A is the total number of anchors in the buoy field.

Example Using Hexagonal Tiling

Figure 2:
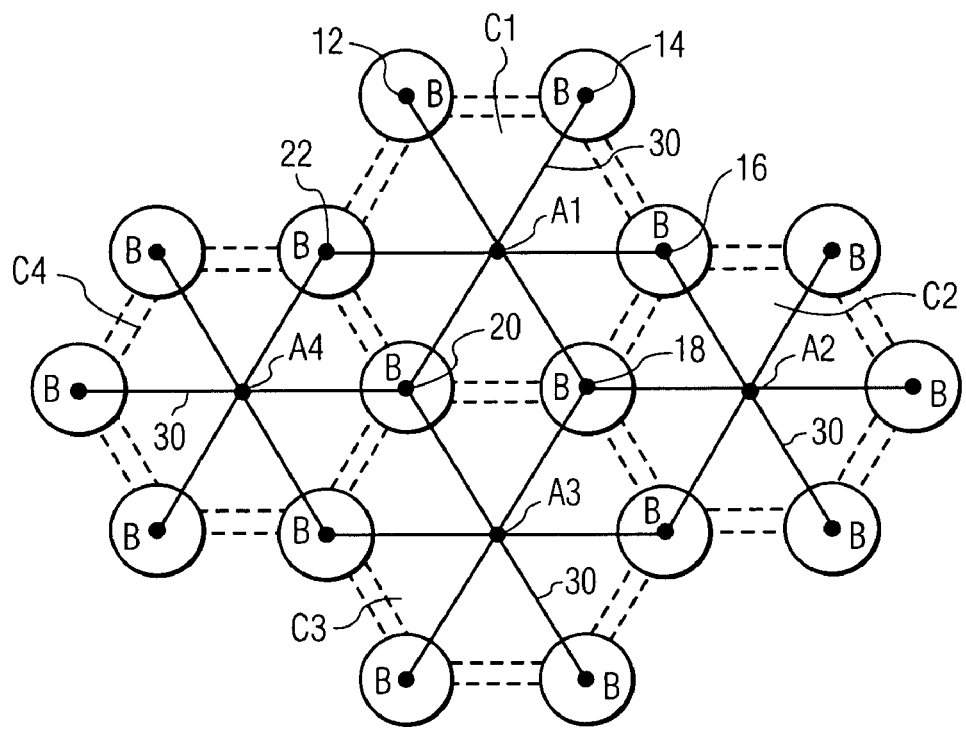
FIG. 2 shows an anchoring (mooring) layout for a plurality of WECs disposed in four contiguous hexagonal cells within a body of water.

Periodic tiling of a plane using a plurality of identical polygons can be achieved using an equilateral triangle, square or hexagon. Of these, hexagonal placement produces the highest value for B/A, i.e., it requires the fewest anchors per buoy. FIG. 2 shows part of a buoy field layout generated by applying the above placement rules to a hexagonal tiling. In the layout, WEC buoys (B) are disposed in a body of water in hexagonal "cells" and the cells are grouped together in a tessellated pattern of contiguous cells. Dash lines are used to show the hexagonal shape of the cells. Four cells C1, C2, C3 and C4 are shown. Adjoining cells share common sides, e.g. the side extending between points marked 16 and 18 is common to both cells C1 and C2.

Figure 2A:
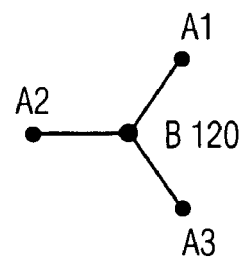
FIG. 2A shows the anchoring connections for a buoy shown in FIG. 2.

A buoy, indicated (FIG. 2) by a circle labeled B, is placed at each hexagon vertex, e.g. at vertices 12, 14, 16, 18, 20 and 22 of the cell C1. An anchor, indicated by a dot labeled A, is placed on the floor of the water body beneath each hexagon centroid. Each anchor A is connected to six buoys B at the vertices of the corresponding hexagon by means of mooring connections 30. Each buoy within the interior of the buoy field (e.g. the buoys located at the vertices 18 and 20) is on three hexagons. For example, the buoy at the vertex 18 is located on the three hexagons C1, C2 and C3. The result is that each such interior buoy has, as shown in FIG. 2A for the buoy at the vertex 20, a stable symmetrical three-point mooring formed by connections to the anchors in the three hexagons (C1, C3 and C4 in FIG. 2) that contain the corresponding vertex.

The buoys on the outside edges of the buoy field shown in FIG. 2, for example, the buoys at the vertices 12, 14, 16, etc. are also provided with three- point moorings. How this is accomplished will become evident in connection with the below description of FIG. 3.

A measure of the efficiency of a buoy layout is given by the asymptotic value of B/A, i.e. the value for a buoy field of infinite extent. For the field layout shown in FIG. 2, the asymptotic value of B/A is 2. For any specific practical (finite) realization of this layout the value of B/A will be less than the asymptotic value. In general, the larger the field, the closer B/A is to the asymptotic value.

Figure 3:
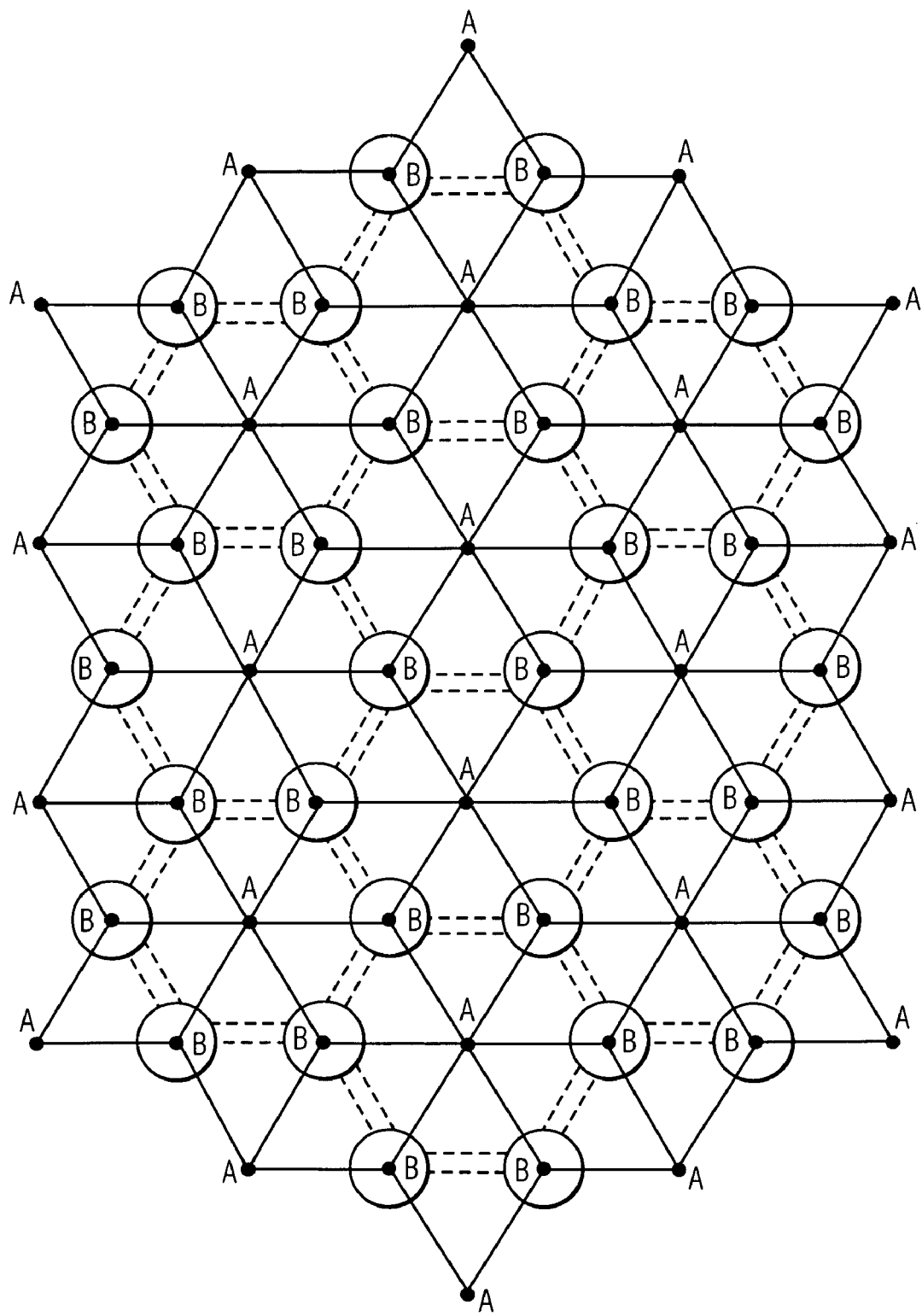
FIG. 3 shows a hexagonal buoy field layout similar to that shown in FIG. 2 but including a greater number of components and showing field edge anchors.

FIG. 3 shows a buoy field layout with 32 buoys (B) and 24 anchors (A). As in FIG. 2, actual mooring lines are shown by solid lines and dash lines outline the hexagonal polygons. Note that at the boundary of the field additional anchors are present to provide a stable mooring for buoys at the edges of the field. For this layout the value of B/A is 1.33. (Although not shown, similar additional anchors are preferably present at the edges of the field shown in FIG. 2.)

Figure 4:
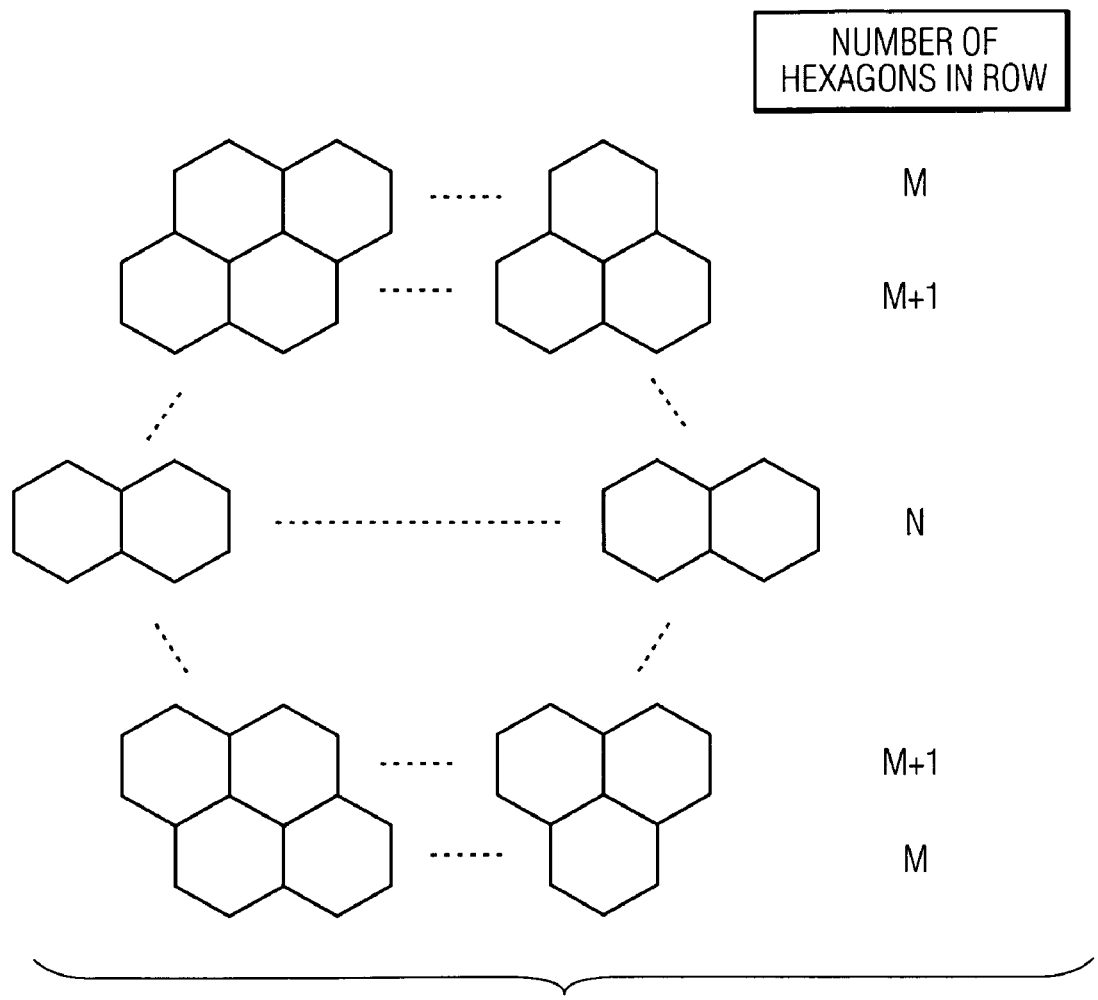
FIG. 4 shows a general hexagonal field layout.

FIG. 4 shows the generic layout of a buoy field based on a regular hexagonal tiling. This layout has a row of M hexagons at the upper boundary, (M+1) hexagons in the next row, and so on, increasing up to N hexagons at the center of the field and decreasing back to M at the lower boundary. For this arrangement the total number of buoys and anchors in the field is given by:

$$A = N \exp 2 + 4N + 4 - M \exp 2 - M$$

$$B = 2N \exp 2 + 4N + 2 - 2M \exp 2$$

Table 1 (included in the Drawing) shows values of A, B and B/A for selected values of M and N.

The value of B/A approaches the theoretical maximum asymptotic value as the size of the buoy field increases.

Example Using Square/Octagon Tiling

Figure 5:
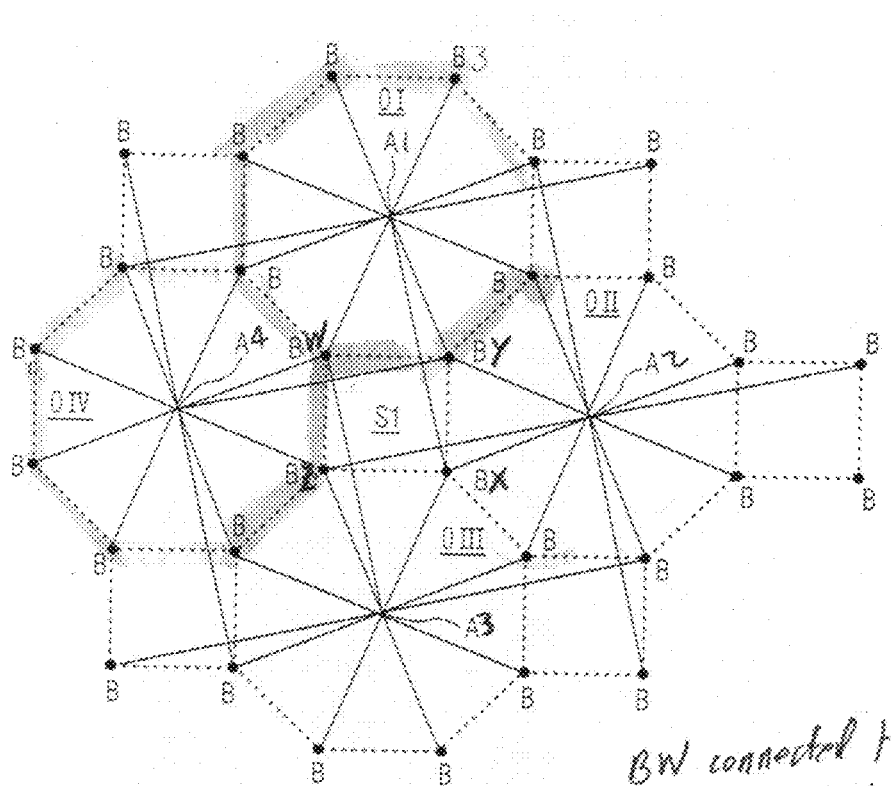
FIG. 5 is similar to FIG. 3 but shows WECs disposed in a basic square/octagon field layout.
Figure 5A:
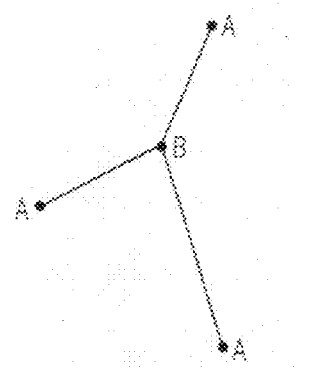
FIG. 5A shows the mooring connections for one buoy shown in FIG. 5.

Other more efficient layouts can be based on more complex tilings. As an example, FIG. 5 shows a layout based on a tiling of a plane using two types of regular polygons—the square and the octagon. As in FIGS. 2 and 3, dash lines are used to outline the polygons; namely, four contiguous octagons 01-04 in an annular array around a central square S1. In this example, one buoy B is located at each vertex, and one anchor A is located on the water body floor at the centroid of each octagon. Each anchor is connected to twelve buoys; eight in the surrounding octagon, and four more, one in each of the adjacent squares. Each buoy has, as shown in FIG. 5A, an asymmetrical, but still stable, three-point mooring.

This configuration achieves an asymptotic B/A value of 4.

TABLE 1

B/A ratio for selected hexagonal layouts

| M | N | A | B | B/A |
|---|---|---|---|-----|
| 1 | 1 | 7 | 8 | 0.857 |
| 1 | 2 | 14 | 16 | 1.143 |
| 1 | 3 | 23 | 30 | 1.304 |
| 1 | 4 | 34 | 48 | 1.412 |
| 1 | 5 | 47 | 70 | 1.459 |
| 1 | 6 | 52 | 96 | 1.548 |
| 1 | 7 | 79 | 126 | 1.595 |
| 1 | 8 | 98 | 160 | 1.633 |
| 1 | 9 | 119 | 198 | 1.664 |

TABLE 1-continued

B/A ratio for selected hexagonal layouts

| M | N | A | B | B/A |
|---|---|---|---|-----|
| 1 | 10 | 142 | 240 | 1.690 |
| 2 | 11 | 163 | 280 | 1.718 |
| 3 | 12 | 184 | 320 | 1.739 |
| 4 | 13 | 205 | 360 | 1.758 |
| 5 | 15 | 259 | 462 | 1.784 |
| 10 | 20 | 374 | 682 | 1.824 |
| 20 | 50 | 2284 | 4402 | 1.927 |

What is claimed is:

1. Apparatus for mooring an assembly of wave energy converters (WECs) to a floor of a body of water comprising:
   a plurality of cells, each cell comprising at least three WECs,
   one central anchor per cell located centrally with respect to the WECs of the cell, each central anchor being attached to the floor of a body of water;
   all the WECs of each said cell being connected via respective mooring lines to the central anchor for that cell;
   each WEC being connected via three mooring lines to three different central anchors; and
   said cells being disposed in a pattern of contiguous cells.

2. Apparatus for mooring an assembly of WECs according to claim 1 wherein pairs of said cells are contiguous to one another along cell boundaries, and
   WECs at boundaries between respective pairs of cells being common to both cells of said pairs.

3. Apparatus for mooring an assembly of WECs according to claim 2 wherein WECs at boundaries between respective pairs of cells are connected to the cell anchors of the respective cells.

4. Apparatus for mooring an assembly of WECs according to claim 1 wherein each said cell anchor is connected only to WECs included within each said cell.

5. Apparatus for mooring an assembly of WECs according to claim 4 wherein the WECs in each said cell are disposed in a hexagonal shaped pattern.

6. Apparatus for mooring an assembly of wave energy converters (WECs) as claimed in claim 1, wherein each cell is a polygon and the WECs of a cell are located at the vertices of the polygon.

7. Apparatus for mooring an assembly of wave energy converters (WECs) as claimed in claim 6 wherein pairs of said cells are contiguous to one another along cell boundaries, and WECs at boundaries between respective pairs of cells being common to both cells of said pairs.

8. Apparatus for mooring an assembly of wave energy converters (WECs) as claimed in claim 6 wherein a WEC located at the vertex of three different polygons is connected to the anchors of the three polygons.

9. Apparatus for mooring an assembly of wave energy converters (WECs) as claimed in claim 6 wherein a WEC located at the vertex of three different polygons is connected to the anchors of the three polygons via mooring lines with the angle between any two mooring lines being less than 180 degrees.

10. Apparatus for mooring an assembly of wave energy converters (WECs) as claimed in claim 1, wherein each WEC includes first and second bodies, with the first body designed to move generally in phase with the waves and generally out of phase with respect to the second body;
   and wherein connection to the anchor is made via a mooring line between the second body and the anchor.

11. Apparatus for mooring an assembly of wave energy converters (WECs) as claimed in claim 1, wherein each WEC includes a first flat float having a central opening and a second elongated float extending through the central opening, said first float moving generally in phase with the waves and said second float moving generally out of phase with the waves.

12. Apparatus for mooring an assembly of wave energy converters (WECs) as claimed in claim 11 wherein connection to the anchor is made via a mooring line between the second float and the anchor.

13. Apparatus for mooring an assembly of wave energy converters (WECs) to a floor of a body of water comprising:
    groups of WECs disposed in cells arranged in a tessellated pattern of contiguous cells including first WECs disposed at interfaces between pairs of cells, said first WECs being common to both cells of said cell pairs, and
    one central anchor per cell, each said central anchor being disposed at a central point within its cell and each said central anchor being attached to the floor of said body of water and the WECs of a cell being connected by mooring lines to the central anchor for that cell and the WECs at the interface between pairs of cells being connected to the central anchors for the respective cells.

14. Apparatus for mooring an assembly of WECs according to claim 13 wherein said cells are each of hexagonal shape including sides and vertices said WECs being disposed at respective ones of said cell vertices.

15. Apparatus for mooring an assembly of WECs according to claim 14 wherein each of said anchors is connected only to WECs within a respective one of said cells.

16. Apparatus for mooring an assembly of WECs according to claim 13 wherein each WEC is connected at a vertex of three cells and each WEC is connected to the central cell anchors of said respective cells.

17. Apparatus for mooring an assembly of wave energy converters (WECs) to a floor of a body of water comprising:
    at least three cells, each cell comprising at least three WECs, each WEC including two bodies where both bodies move relative to each other in response to waves;
    one central anchor per cell located centrally with respect to the WECs of the cell, each central anchor being attached to the floor of a body of water;
    all the WECs of each said cell being connected via mooring lines to the central anchor for that cell; and
    each WEC being solely connected via mooring lines to three different central anchors.

18. A method for mooring an assembly of wave energy converters (WECs) to a floor of a body of water comprising the steps of:
    arranging the assembly of WECs into a plurality of cells, each cell comprising at least three WECs;
    connecting three mooring lines to each WEC;
    connecting all the WECs of each cell via one of their respective mooring lines to a central anchor located centrally with respect to the WECs of the cell; each central anchor being attached to the floor of a body of water;
    connecting each WEC via three mooring lines to three different central anchors; and
    wherein said cells are disposed in a pattern of contiguous cells for reducing the number of anchors.

19. Apparatus for mooring an assembly of wave energy converters (WECs) to a floor of a body of water comprising:
    a first row of M cells, each cell comprising at least three WECs;
    a last row of M cells, each cell comprising at least three WECs;
    a central row of N cells, each cell comprising at least three WECs;
    one anchor per cell located centrally with respect to the WECs of the cell and each anchor being connected to the floor of a body of water, and all the WECs of each cell being connected via mooring lines to the centrally located anchor of that cell; and the cells being arranged in a pattern of contiguous cells with the WECs of contiguous cells being common to their respective cells whereby the number of anchors per the total number of WECs is reduced.

20. The apparatus for mooring an assembly of wave energy converters as claimed in claim 19 further including X additional rows formed between the first row and the central row, each one of said X additional row having an increasing number of cells of WECs in going from said first row to said central row;
    Y additional rows formed between the last row and the central row, each one of said Y additional row having an increasing number of cells of WECs in going from said last row to said central row;
    and where:
    (a) the number of WECs (W) is given as $W = 2N\exp2 + 4N + 2 - 2M\exp2$; and
    (b) the number of anchors (A) is given by $A = N\exp2 + 4N + 4 - M\exp2 - M$;
    and where:
    M is an integer equal to or greater than one;
    N is an integer equal to or greater than two;
    X is an integer equal to or greater than zero;
    Y is an integer equal to or greater than zero.

* * * * *